Patented Sept. 12, 1922.

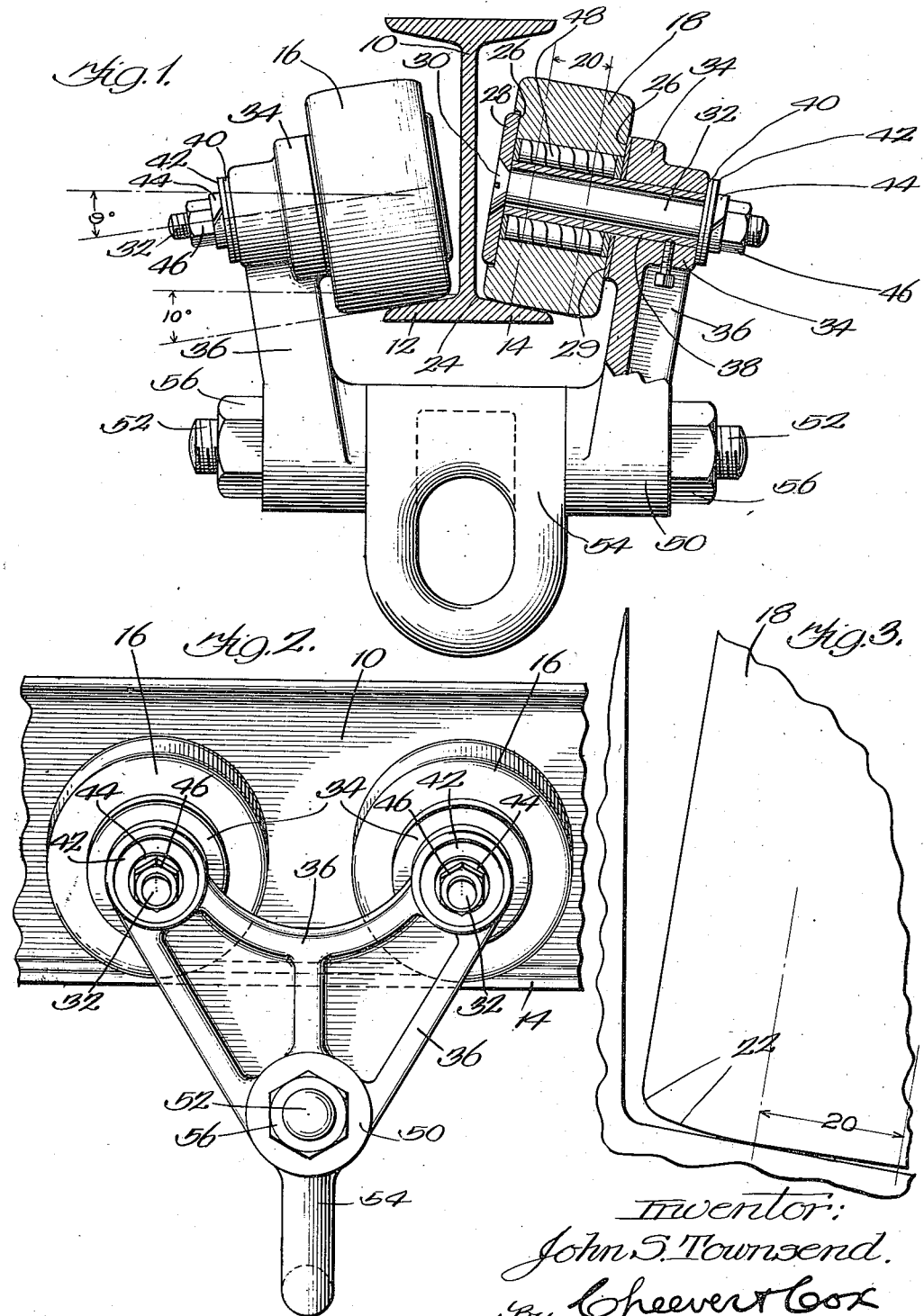

1,429,118

UNITED STATES PATENT OFFICE.

JOHN S. TOWNSEND, OF HARVEY, ILLINOIS, ASSIGNOR TO WHITING CORPORATION, OF HARVEY, ILLINOIS, A CORPORATION OF ILLINOIS.

TROLLEY.

Application filed February 4, 1921. Serial No. 442,506.

*To all whom it may concern:*

Be it known that I, JOHN S. TOWNSEND, a citizen of the United States, residing at Harvey, in the county of Cook and State of Illinois, have invented a certain new and useful Improvement in Trolleys, of which the following is a specification.

This invention relates to trolleys, particularly those for use in connection with traveling cranes and other hoisting mechanisms which run on the lower flanges of an I-beam.

The object of the invention is to provide a device of this kind which is very simple and light in construction, therefore, inexpensive, which is readily applicable to use in connection with I-beams of different sizes and which is very satisfactory and efficient in use. The invention consists in means for carrying out the foregoing objects and in many features and details of construction which will be hereafter more fully set forth in the specification and claims.

Referring to the drawings in which like numerals designate the same parts throughout the several views:—

Figure 1 is an end view of the trolley of this invention, partially in section, shown in operative position on an I-beam also in section.

Figure 2 is the side view of the trolley mechanism of Figure 1, taken from the left.

Figure 3 is an enlarged detail view of the trolley wheel and the adjacent I-beam flange, the latter being shown in section.

In the drawings the mechanism of this invention is shown applied to an ordinary horizontal I-beam 10 suitably suspended by mechanism not shown so that the trolley wheels can travel along the respective beam flanges 12 and 14.

On one side of this beam, as the left side, are two trolley wheels 16 in tandem, while on the other side are two corresponding wheels 18 identical therewith. These two sets of wheels travel respectively on beam flanges 12 and 14.

Attention is called to the fact that each one of these wheels is made in the form of a plain cylindrical roller, viz: without a flange, with a cylindrical portion 20 occupying the central longitudinal part of its cylindrical surface—this perfectly cylindrical portion 20 rounding off at the edges of the wheel into the curves 22 which readily cooperate with the angular turns 24 of the flanges of the I-beam as they merge into the I-beam. These rounded corners or edges of the wheels are important in preventing binding of the trolley with the I-beam flange, should anybody give the whole trolley mechanism an undue lateral swing with reference to the I-beam, as is apt to be the case when an operator is moving the unloaded trolley rapidly along these beams. The cylindrical character of the wheels is important in making it possible to apply the trolley to I-beams of varying sizes and consequently varying flange widths without anything on the wheels interfering with the outer edges of the I-beam flanges as might occur were flanged wheels used.

The side wall of each roller 18 is provided with a depression 26 adapted to receive a washer 28 or 29, as the case may be, the former held in place by the head 30 of a central bolt or shaft 32 which extends through the wheel and the hub 34 on the upper end of the adjacent wheel carrying bracket 36. Surrounding this bolt 32 is a sleeve 38 bearing at one end against the washer 28 and held in place at the other end by fiber washer 40, an ordinary washer 42, lock washer 44, and a nut 46 threaded upon the end of bolt 32. Around this sleeve 38 and bearing thereon are roller bearing devices 48 on which the wheel 18 rotates in the ordinary manner. The recesses 26 in the sides of the wheel are provided so that the wheel is interchangeably positionable with either side toward the I-beam, thus allowing for rearrangement of the device, should one side of the wheel become worn.

Each bracket 36 rises from a hub 50 punctured by a bolt 52 which passes through them and intervening load carrying mechanism 54. The bolt 52 is secured in place by suitable nuts 56 at opposite ends thereof.

It will be noticed that the bracket arms 36 and cooperating parts are quite heavy and prepared to withstand the strain occasioned by the movement of the wheels 16 or 18, as the case may be, toward them so that the washer 28, its connection 30, with the bolt 32 does not have to be at all heavy as would be required where there is strong movement of the wheel toward the I-beam. This is accounted for by one of the special features of the invention which consists in making the axis of the bolt 32 and consequently of the wheels carried by it, approximately one degree less with reference to a horizontal plane, than the angle of the adjacent I-beam flange 12 or 14 face, as the case may be. It is standard practice to make the I-beam flanges 10 degrees with the horizontal as indicated by the angle 10° at the left of Figure 1. This being the case the angle marked 9° for the adjacent bolt 32 is made 9 degrees or thereabout. The result of this construction is that as the trolley moves along the I-beam each roller or wheel normally tends to travel down against the adjacent beam flange toward its adjacent bracket member 36 and does not tend to move upward toward the washer 28 as would be the case were this difference in angularity absent. Because of this construction the washer mechanism 28 can be lightened as it is in the drawing without danger of injury to the device.

Owing to the bracket construction shown in which each pair of tandem wheels is on one bracket and the two brackets are more or less loosely connected by the bolt mechanism 52, the device automatically so adjusts itself that when a load is carried on a load carrying hook 54 all four wheels of the trolley always take effective bearing on an adjacent flange with the result that the load is evenly distributed between the whole four wheels.

Having thus described my invention, what I claim as new and desire to secure by Letters Patent, is:—

1. In mechanism of the class described a track, adapted to be traveled by a trolley wheel, having a wheel engageable face inclined downwardly at a definite angle to the horizontal, a support for a wheel which is to travel parallel thereto and a wheel rotatably mounted on the wheel support traveling on said track, the main central part of the circumferential surface of the wheel being cylindrical and at an angle to the horizontal, slightly less than the angularity to the horizontal of the track on which it travels.

2. In mechanism of the class described, the combination of an I-beam, having on opposite sides flat lower flanges, downwardly inclined, a U-shaped carrier member including two upwardly extending brackets, one on each side of the I-beam and a cross connecting member below the I-beam, a shaft projecting from each bracket toward the I-beam and above the adjacent roller carrying flange thereof and a wheel on each shaft traveling on the adjacent flange, the axis of the wheels being such that the cylindrical circumferences of the wheels contact the I-beam flanges at approximately one degree less with reference to the horizontal than the corresponding angularity of the I-beam flanges.

3. A wheel mounting for a trolley of the class described, comprising a supporting bracket member, a wheel adjacent to the bracket, a bolt extending through the wheel and bracket, a sleeve outside the bolt also extending through the sleeve and bracket, anti-friction rollers around the sleeve inside the wheel, a washer 28 on the wheel end of the bolt holding the rollers in place and securing devices including a fiber washer and other washers attached to the opposite end of the bolt.

4. In mechanism of the class described, a track adapted to be traveled by a wheel having a trolley wheel engageable face inclined downwardly at a definite angle to the horizontal, a wheel support adapted to travel in general parallel to the track, a cylindrical wheel rotatably mounted on said wheel support on an axis angular to the horizontal and adapted to travel on said track, the circumferential surface of the wheel being in its central cylindrical portion concentric with the axis of the wheel and engaging the track at an angle to the horizontal slightly less than the angularity to the horizontal of the track on which it travels.

5. In mechanism of the class described, a track adapted to be traveled by a wheel having a trolley wheel engageable face inclined downwardly at a definite angle to the horizontal, a wheel support adapted to travel in general parallel to the track, a substantially cylindrical wheel with rounded edges rotatably mounted on said wheel support on an axis angular to the horizontal and adapted to travel on said track, the circumferential surface of the wheel being concentric with the axis of the wheel and engaging the track at an angle to the horizontal slightly less than the angularity to the horizontal of the track on which it travels.

In witness whereof, I have hereunto subscribed my name in the presence of two witnesses.

JOHN S. TOWNSEND

Witnesses:
O. L. COFFEY,
PAUL W. BIELFELDT.